United States Patent
Kurfiss et al.

(10) Patent No.: US 7,438,774 B2
(45) Date of Patent: Oct. 21, 2008

(54) METHOD AND DEVICE FOR FASTENING AND ALIGNING A SENSOR

(75) Inventors: Frank Kurfiss, Muehlacker (DE); Uwe Apel, Neckartaiflingen (DE); Andre Skuppin, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 512 days.

(21) Appl. No.: 10/524,783

(22) PCT Filed: Jul. 10, 2003

(86) PCT No.: PCT/DE03/02314

§ 371 (c)(1),
(2), (4) Date: Feb. 16, 2005

(87) PCT Pub. No.: WO2004/020250

PCT Pub. Date: Mar. 11, 2004

(65) Prior Publication Data

US 2005/0259244 A1 Nov. 24, 2005

(30) Foreign Application Priority Data

Aug. 24, 2002 (DE) ................................ 102 38 935

(51) Int. Cl.
*B32B 41/00* (2006.01)
(52) U.S. Cl. .............................. 156/64; 156/94; 156/98; 396/419; 396/427; 396/428
(58) Field of Classification Search .................... 156/94, 156/98, 64; 348/148; 396/419, 427, 428
See application file for complete search history.

(56) References Cited

U.S. PATENT DOCUMENTS

| 5,589,026 | A |   | 12/1996 | Perecman |
|---|---|---|---|---|
| 5,661,303 | A | * | 8/1997 | Teder ...................... 250/341.8 |
| 6,337,491 | B1 |   | 1/2002 | Krieg et al. |
| 2004/0208497 | A1 |   | 10/2004 | Seger et al. |

FOREIGN PATENT DOCUMENTS

| DE | 40 40 579 | 6/1992 |
|---|---|---|
| DE | 198 27 044 | 10/1999 |
| DE | 696 03 598 T | 5/2000 |
| DE | 101 62 652 | 7/2003 |
| EP | 0 934 851 | 8/1999 |
| EP | 0 982 196 | 3/2000 |
| JP | 11-78716 | 3/1999 |
| JP | 2001-197337 | 7/2001 |
| JP | 2002-207149 | 7/2002 |

OTHER PUBLICATIONS

Patent Abstracts of Japan, vol. 2002, No. 11, Nov. 6, 2002.
Patent Abstracts of Japan, vol. 1999, No. 08, Jun. 30, 1999.
Patent Abstracts of Japan, vol. 2000, No. 24, May 11, 2001.

* cited by examiner

*Primary Examiner*—George R Koch, III
(74) *Attorney, Agent, or Firm*—Kenyon & Kenyon LLP

(57) ABSTRACT

A method and a device are provided for fastening and aligning a sensor, e.g., in motor vehicles, the sensor being connected to a support via a holding element. By reworking the sensor seating surface, a precise alignment of the sensor axis with the nominal direction may be achieved.

12 Claims, 3 Drawing Sheets

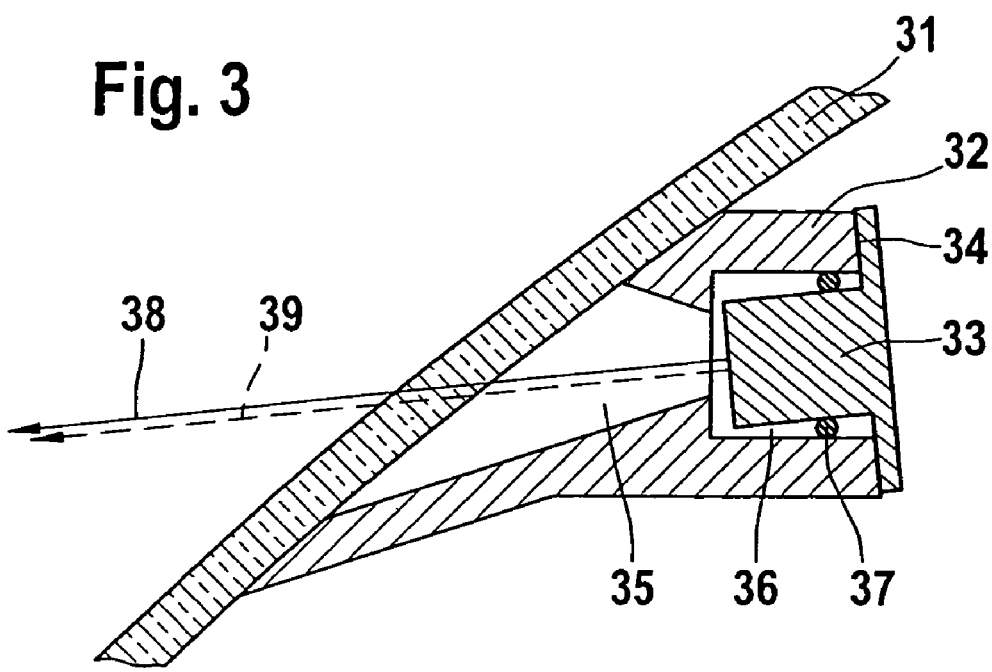
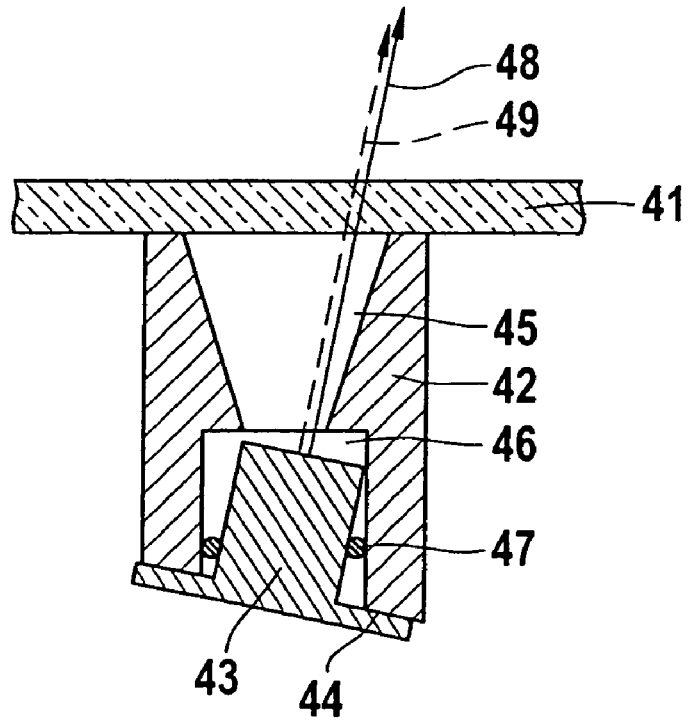

METHOD AND DEVICE FOR FASTENING AND ALIGNING A SENSOR

This application is a national stage entry of PCT/DE03/02314, filed on Jul. 10, 2003.

FIELD OF THE INVENTION

The present invention relates to a method and a device for fastening and aligning a sensor, e.g., a video sensor, on the windshield of a motor vehicle.

BACKGROUND INFORMATION

Motor vehicles may be equipped with a plurality of sensors, such as ultrasound sensors or video sensors, in order, for example, to gather information about the surroundings of the motor vehicle. The fastening and aligning of these sensors on the vehicle deserve great importance, in this context, so that the functioning of the sensors may be ensured.

In particular, in motor vehicles, video sensors are used in larger numbers for gathering information on the surroundings. Stereo camera systems, for instance, are used for observing the road space located ahead of the motor vehicle, for object recognition or the measurement of distance from a preceding motor vehicle. In this context, in stereo camera systems two video sensors are used, which are positioned in such a manner that they record essentially the same scene.

German Published Patent Application No. 101 62 652.5 describes methods for fastening video sensors in the passenger compartment of a motor vehicle, the sensor being connected via a holding element to a support, especially the inner side of the windshield or the roof. A disadvantage of these methods is that no precise mechanical alignment of the sensors is undertaken. Especially in the case of stereo camera systems, the commonly recorded viewing angle of the video sensors determines the useful range of the system, since for the evaluation of the image information, overlapping image ranges of both video sensors may be needed. The precise mechanical alignment of the video sensors, that is, the setting of the sensor axis, plays a decisive role here for the useful range of the stereo camera system and for the subsequent image processing.

In this context, the sensor axis is regarded as a preferred direction having a view of the measuring process. In a video sensor, the optical axis corresponds to the sensor axis.

SUMMARY

The method described below, for fastening and aligning a sensor via a holding element to a support, may provide that a precise alignment of the sensor axis takes place in the nominal direction. In motor vehicles, stereo camera systems are used, for example, to gather information from the surroundings of the motor vehicle, the stereo camera systems being made up of two video sensors, which record essentially the same scene. To evaluate the image information, two overlapping image ranges of the two video sensors may be required. The viewing angle of the two video sensors recorded in common defines, in this case, the range of the stereo camera system. Because of the precise alignment of the video sensors, the method described herein may increase the useful range of the stereo camera system. In the case of stereo camera systems, the method described and the device may make possible the fastening and the precise alignment of the sensor axes of the two video sensors relative to each other. For example, the setting of the sensor axes of the two video sensors is made possible such that there is squinting or strabismus of the video sensors. In this context, the recorded range of the stereo camera system is placed closer to the motor vehicle during installation in the motor vehicle.

By reworking the sensor seating surface, the method described in the following and the device may make possible the fastening and alignment of at least one sensor, e.g., in motor vehicles. The precise alignment of the sensor axis of the at least one sensor may be achieved by the determination using measuring techniques of the deviation of the sensor axis from the nominal direction by the surveying of the sensor seating surface and the subsequent reworking.

In an example embodiment, by the use of at least one video sensor, the deviation of the sensor axis from the nominal direction is determined by temporarily not installing the at least one video sensor in the holding element that has not been reworked. By determining the deviation by methods of image processing, such as by calibrating methods in a calibrating field, the manufacturing tolerances of the support and/or the holding element and/or the sensor seating surface and/or the video sensor are determined, and are compensated for during subsequent reworking.

In an example embodiment, a carrier is used to which the support is connected. The carrier is a part of the reworking device. The relative position of the support and the holding element with respect to the reworking device is determined by the use of the carrier. The reworking device makes possible the reworking of the sensor seating surface by material-removing reworking methods, e.g., milling, drilling and/or laser processing, etc. The previous measurement of the deviation of the sensor axis from the nominal direction may be omitted, because the position of the support is directly determined by the connection of the support to the carrier. This may make possible the cost-effective carrying out of the method, since costly measuring units for determining the deviation of the sensor axis from the nominal direction may not be necessary.

The method for fastening and aligning various sensor types, such as ultrasound sensors, light-sensitive sensors, video sensors or sensors for electromagnetic radiation may be used. The only assumption is that the sensors have a sensor axis.

The method may be able to be used with convex, concave and/or level surfaces of the support. The method described and the device may be provided for fastening and aligning sensors, e.g., video sensors, at the windshield of a motor vehicle. Windshields in motor vehicles have a curved surface. Because of the molding process during manufacturing of the windshield, the curvature demonstrates a wide divergence. The holding element often also has component part tolerances, which result in deviation of the sensor axis from the nominal direction. If there are component part tolerances of the windshield and/or the holding element, the method may lead to precise alignment of the sensor axis in the nominal direction.

The method may be used with any nominal direction of the sensor axis. The method may be suitable if the sensor axis points in the direction of the holding element and the support, or in the opposite direction.

During aligning of the sensor axis to the holding element and the support, the support and/or the holding element have to be transparent to the quantities influencing the sensor. The transparency for the sensor-influencing quantities may also be achieved by material-removing processing methods.

The method may be able to be applied in conjunction with the use of an adhesion process for fastening the holding element to the support. The precise alignment of the sensor may be carried out at the same time as the hardening of the adhesive, by reworking the sensor seating surface. This may ensure a rapid performance of the fastening of the holding element, and the accurate alignment of the sensor axis may take place at the same time. When the method described is used for fastening video sensors to the inside of the windshield of a motor vehicle, the method described may lead to time and cost saving, because the two method steps may be carried out in parallel.

The reworking of the sensor seating surface by various material-removing processing methods, e.g., milling, drilling and/or laser processing, etc., may take place depending on the type and the properties of the material used for the holding element.

The method described may make possible the aligning of the sensor with respect to its rotation about the sensor axis, by mounting a centering pin receptacle. Mounting the centering pin receptacle may be able to take place during the reworking of the holding element, and that because of that no additional method step may be required. This may ensure a rapid and cost-effective execution of the method.

The accommodation may be protected by a cover element for a part of the sensor and/or the sensor antechamber, during the reworking of the sensor seating surface, from the intrusion of chips and other contaminations. When one is installing video sensors, this may lead to a better image quality, because the optical path of the images may not be disturbed by soiling. This may lead to an extension of the useful life of the sensors, since otherwise, for example, remaining diluted soluble oil or cutting oil may be able to lead to corrosion of the sensor and/or the holding element.

The device described below for fastening and aligning a sensor, via a holding element, to a support may provide that, during the reworking of the sensor seating surface for the alignment of the sensor in the nominal direction, the accommodation may not have to be changed. This may lead to an execution of the method that saves time and costs, since an additional processing of the holding element may not be necessary. It may be provided that the sensor seating surface may be reworked by using an oversize, and the accommodation may be larger than the part of the sensor to be accommodated, because of the use of the oversize.

The device may be designed such that the sensor antechamber is bigger than the angular coverage of the sensor. This may make reworking the sensor's antechamber, while processing the sensor seating surface, unnecessary. This may lead to an execution of the method described that saves time and costs.

In an example embodiment of the device, with the sensor installed, the accommodation and the sensor antechamber are sealed from the surroundings by a sealing ring. When using a video sensor, this may lead to a reduction of soiling of the sensor during operation, and thereby to an improvement of the image quality.

Further aspects are set for the below in the following description of exemplary embodiments with reference to the appended Figures.

BRIEF DESCRIPTION OF THE DRAWINGS

FIG. 3 is a side view of a device for fastening and aligning a sensor after the reworking of the sensor seating surface.

FIG. 4 is a top view of a device for fastening and aligning a sensor after the reworking of the sensor seating surface

DETAILED DESCRIPTION

Figure 1:
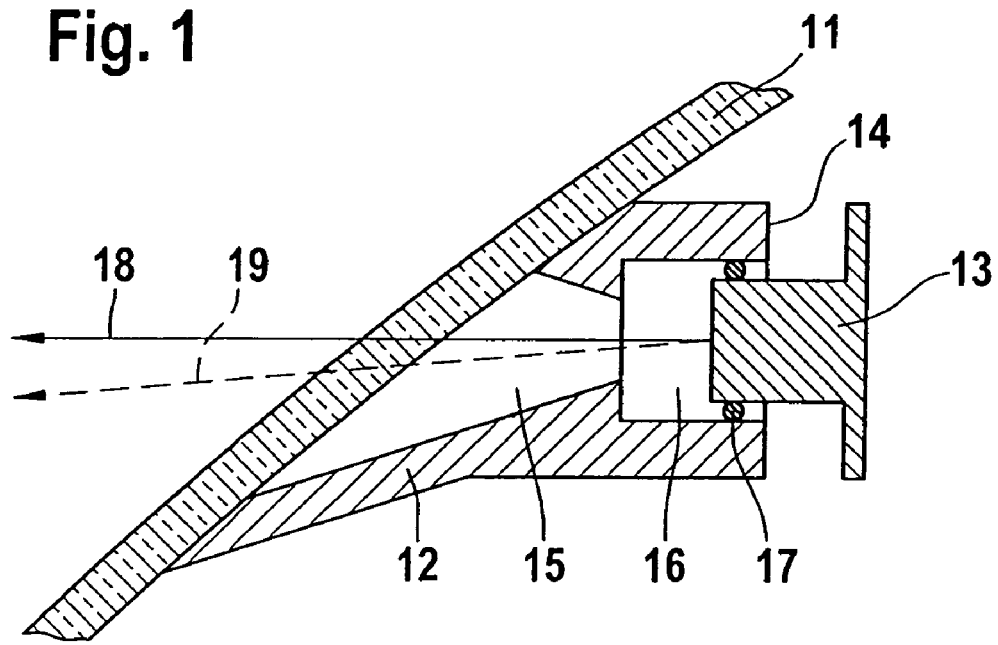
FIG. 1 is a side view of a device for fastening and aligning a sensor before the reworking of the sensor seating surface.
Figure 2:
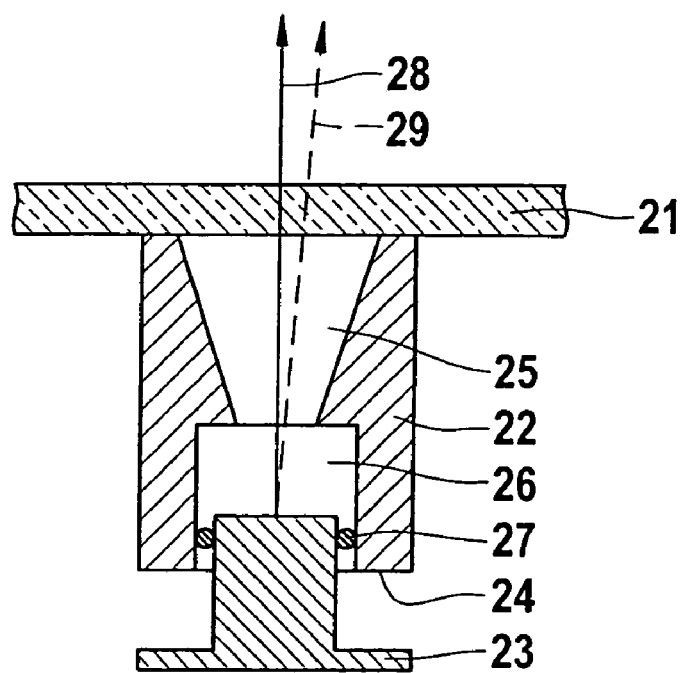
FIG. 2 is a top view of a device for fastening and aligning a sensor before the reworking of the sensor seating surface.

FIGS. 1 and 2 show the side view and the top view of a device for fastening and aligning a sensor 13, 23, in an exemplary embodiment a video sensor, before the reworking of sensor seating surface 14, 24. The support 11, 21, on which video sensor 13, 23 is mounted, is the windshield of a motor vehicle. Video sensor 13, 23 is connected via a holding element 12, 22 to the support 11, 21. The connection of video sensor 13, 23 to holding element 12, 22 is made via seating surface 14, 24. Holding element 12, 22, in an exemplary embodiment, has a cylindrical accommodation 16, 26 for a part of video sensor 13, 23. Sensor antechamber 15, 25 is used as a baffle, for the reduction of interfering, stray pick-up light. In FIGS. 1 and 2, the deviation of sensor axis 18, 28 from the nominal direction 19, 29 is illustrated. In an exemplary embodiment, sensor axis 18, 28 is determined by the optical axis of the video sensor 13, 23. In an exemplary embodiment, nominal direction 19, 29 is determined relatively with respect to the axis of travel of the motor vehicle. Nominal direction 19, 29 is determined with respect to the axis of travel by, e.g., two angles, such as the vertical pitch angle and the horizontal yaw angle. In the first variant of an exemplary embodiment, for example, nominal direction 19, 29 is parallel to the axis of travel, whereas in the second variant the nominal direction is tilted vertically with respect to the axis of travel.

In the first method step, holding element 12, 22 is connected to support 11, 21, for example, by an adhesion process. In an exemplary embodiment, holding element 12, 22 is located on the inside of a motor vehicle's windshield. Holding element 12, 22 is fastened close to the inner rearview mirror, so as simultaneously to lie in the wiped area of the windshield and to impair the view of the driver as little as possible.

In a first variant of an exemplary embodiment, after hardening of the adhesive, in the next method step, the deviation of sensor axis 18, 28 from nominal direction 19, 29 is determined by measurement techniques. The deviation of sensor axis 18, 28 from the nominal direction 19, 29 may be ascertained indirectly by measuring sensor seating surface 14, 24. The measurement is made in this case by optical and/or mechanical measuring methods, such as probes. Alternatively, in a second variant of an exemplary embodiment, temporary installation of video sensor 13, 23 in non-reworked holding element 12 is possible. The deviation of sensor axis 18, 28 from the nominal direction 19, 29 may be ascertained indirectly by measuring sensor seating surface 14, 24. In this context, the deviation is ascertained by the method of image processing.

In a further variant of an exemplary embodiment, the ascertainment of the deviation of sensor axis 18, 28 from nominal direction 19, 29 by measuring techniques may not be necessary. Rather, in this variant, support 11, 21, the windshield, is fastened using a carrier which is a part of the reworking device. The carrier determines the relative position of support 11, 21 and of holding element 12, 22 with respect to the reworking device. This makes possible a direct reworking, without previous measuring of the deviation of sensor axis 18, 28 from nominal direction 19, 29.

In the following method step, reworking of sensor seating surface 14, 24 is carried out, for instance, on the basis of the deviation ascertained. To rework holding element 12, 22 that has been produced by die-casting technology, various material-removing processing methods, e.g., milling, drilling and/or laser processing, etc., may be used.

In the last method step, video sensor 13, 23 is connected to holding element 12, 22 via reworked sensor seating surface 14, 24. For the connection, various methods may be used, e.g., adhesion, screw connection or snap-in techniques, etc. Sealing ring 17, 27 is used for sealing accommodation 16, 26 and sensor antechamber 15, 25 of holding element 12, 22 from the surroundings of the device, e.g., during operation of video sensor 13, 23.

FIGS. 3 and 4 show the side view and the top view of a device for fastening and aligning a sensor 33, 43 after processing sensor seating surface 34, 44. Holding element 32, 42 is connected to support 31, 41. Sensor axis 38, 48 is aligned in nominal direction 39, 49.

Accommodation 36, 46 may be dimensioned by an oversize such that it is able to accommodate the tilting of video sensor 33, 43 after processing of sensor seating surface 34, 44 in diameter and depth. Sensor antechamber 35, 45 is established as a conical opening such that, after the processing of sensor seating surface 34, 44, the angular coverage of video sensor 33, 43 is not restricted by the walls of sensor antechamber 35, 45. Sealing ring 37, 47 makes possible the sealing of the inner space of holding element 32, 42 after processing of sensor seating surface 34, 44, sealing ring 37, 47 being formed such that in the case of tilting of video sensor 33, 43, sealing may be ensured. Holding element 32, 42 is formed such that processing of sensor seating surface 34, 44 is possible when holding element 32, 42 is connected to support 31, 41. At the same time, sensor seating surface 34, 44 is dimensioned such that the function and stability of holding element 32, 42 is not impaired by reworking. This may be achieved by fixing an oversize.

Figure 5:
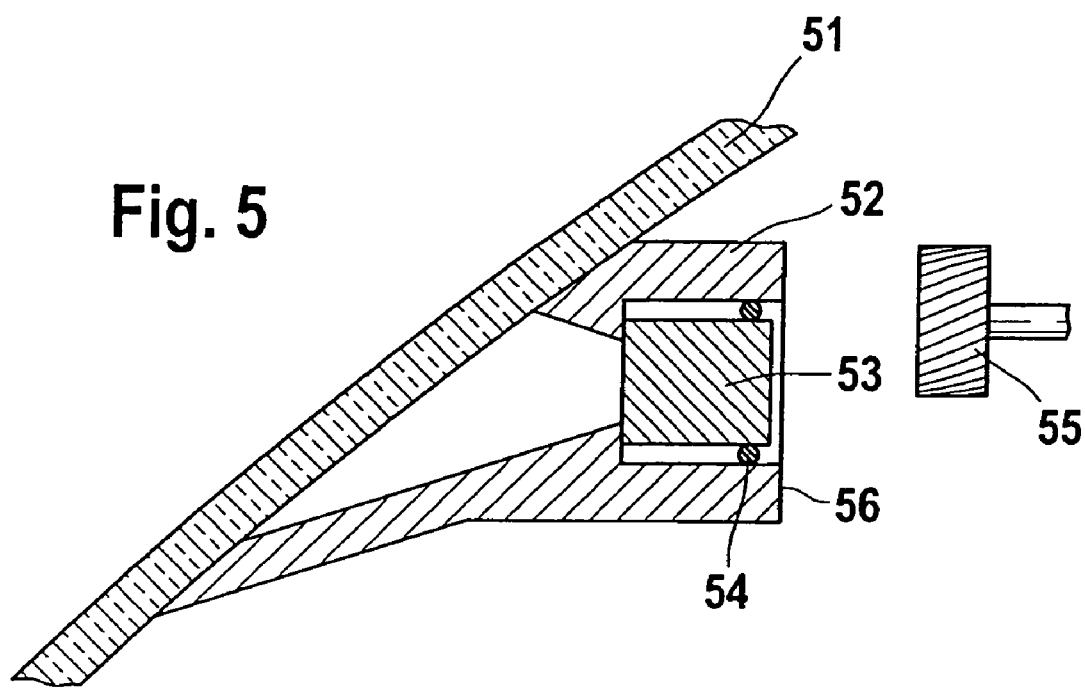
FIG. 5 is a side view of a device having a cover element during the reworking using a milling head.

FIG. 5 shows a variant of an exemplary embodiment. In the reworking of sensor seating surface 56 of holding element 52 which is connected to support 51, a cover element 53 protects the inner space of holding element 52 from the intrusion of chips and/or dirt because of the processing of sensor seating surface 56, e.g., by cutting head 55. Seal 54 may ensure the waterproof and dirt-tight sealing of the inner space.

Figure 6:
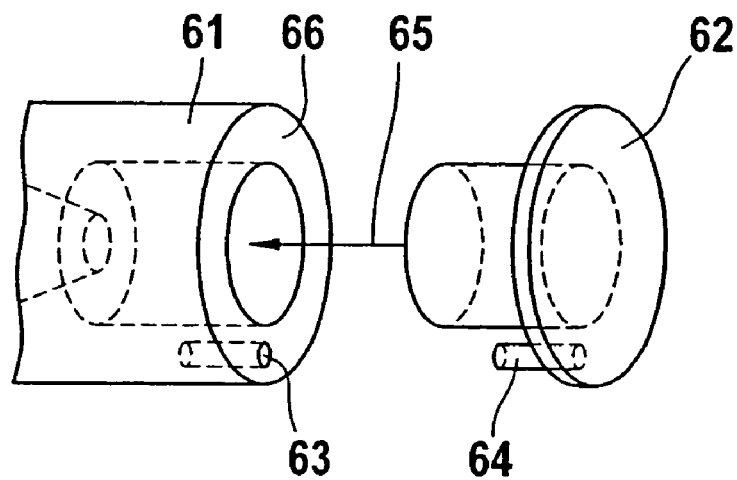
FIG. 6 illustrates a device having a centering pin receptacle and a centering pin for aligning the sensor.

FIG. 6 shows holding element 61 having a centering pin receptacle 63 and centering pin 64 for aligning sensor 62, a video sensor in an exemplary embodiment, about sensor axis 65. Minimizing the rotation of video sensor 62 about sensor axis 65 may be necessary, for example, in order to obtain good image quality. During the reworking of sensor seating surface 66, applying centering pin receptacle 63 is possible in the same method step. The alignment of video sensor 62 is performed by centering pin 64. In an example embodiment, the use of two or more centering pin receptacles 63 and centering pins 64 may be possible.

The method described and the device are not limited to the fastening and alignment of video sensors 13 on the windshield of motor vehicles. The method and the device are suitable for all sensor types that have a sensor axis 18, e.g., ultrasound sensors, light-sensitive sensors, video sensors and/or sensors for electromagnetic radiation, such as radar radiation, such as radar sensors, etc. For example, in the case of ultrasound sensors or sensors for electromagnetic radiation, sensor axis 18 is defined by the central axis of the radiation lobe. In an exemplary embodiment in the motor vehicle, nominal direction 19 in ultrasound sensors is also defined relative to the axis of travel. It is possible, for instance, to connect a plurality of sensors 13 of the same and/or various types to a support 11 via a holding element 12. This variant of the method permits the simultaneous, precise fastening and alignment of a plurality of sensors 13 via one holding element 12. The only assumption is that holding element 12 has a sensor seating surface 14, for each sensor 13, which is able to be reworked. The method described and the device may make possible the fastening and the alignment of two video sensors which record the same scene, e.g., stereo camera systems. In this context, the video sensors may be connected to support 11, either via a single holding element 12 having two sensor seating surfaces 14, or via two holding elements 12 each having one sensor seating surface 14. As the support, using convex, concave and/or flat surfaces, etc., is possible for accommodating holding element 12. Support 11 and/or holding element 12 may have component part tolerances which are compensated for by the method and the device. The alignment of sensor axis 18 of sensor 13 is as desired. For example, there is alignment with support 11 and holding element 12, or the opposite. Other methods than adhesion processes are possible for connecting holding element 12 to support 11. For example, in the case of supports 11 made of metal or plastic, detachable or non-detachable connections such as screws or rivets are possible.

In an example embodiment, holding elements 12 without accommodation 16 and/or sensor antechamber are possible. In this variant, sensor 13 is fastened directly to sensor seating surface 14.

If an accommodation 16 and/or a sensor antechamber 15 is present, their shape will depend on the properties of sensor 13. The shape of accommodation 16 may have to be adapted to the geometrical properties of sensor 13, whereas sensor antechamber 15 has to correspond to the angular coverage of sensor 13. The geometrical properties of sensor seating surface 14 may also correspond to the sensor type, e.g., a planar or point-shaped sensor seating surface 14 may be present. The material of support 11 and/or of holding element 12 may have to be partially or completely transparent to the sensor-influencing variables because of the material properties, and/or the transparency to the sensor-influencing variables is achieved by material-removing processing methods. In an exemplary embodiment, the windshield, which is made of glass, is partially transparent to light in the visible range, whereas the transparency of holding element 12 is achieved by an opening in the form of sensor antechamber 15.

In an exemplary embodiment, the determination of the deviation of sensor axis 18 from nominal direction 19 and/or the reworking of sensor seating surface 14 are carried out during the hardening of the adhesive in the adhesion process for connecting holding element 12 to support 11. This procedure may be suitable for all connections of holding element 12 to support 11 that require a longer time to reach the final fastness.

In an exemplary embodiment, it is possible that one may change the sequence of the individual method steps. For example, it is possible first to determine the deviation of sensor axis 18 from nominal axis 19, then to rework sensor seating surface 14 on account of the ascertained deviation of sensor axis 18 from nominal direction 19, so that one may subsequently connect holding element 12 to support 11. In the last method step, sensor 13 is connected to holding element 12. Alternatively, even after the reworking, fastening sensor 13 to holding element 12 and subsequently fastening holding element 12, having sensor 13 on it, to support 11 is possible.

What is claimed is:

1. A method for fastening and aligning at least one sensor including a sensor axis, comprising:

connecting a holding element including a sensor seating surface for the sensor to a support;

connecting the sensor to the support via the holding element;

ascertaining a deviation, present without reworking, of the sensor axis from a nominal direction;

reworking the sensor seating surface, based on the ascertained deviation, to align the sensor axis of an installed sensor in the nominal direction; and connecting the sensor to the holding element at the reworked sensor seating surface.

2. The method according to claim 1, wherein the support is arranged in a motor vehicle.

3. The method according to claim 1, further comprising arranging the support and the holding element into a carrier, the sensor seating surface reworked in the reworking step by a reworking device connected to the carrier to align the sensor axis in the nominal direction.

4. The method according to claim 1, wherein the sensor includes at least one of (a) an ultrasound sensor, (b) a light-sensitive sensor, (c) a video sensor, (d) an electromagnetic radiation sensor, and (e) a radar sensor.

5. The method according to claim 1, wherein the sensor axis is one of (a) in a direction of the holding element and the support and (b) in a direction opposite to the direction of the holding element and the support.

6. The method according to claim 1, wherein the holding element is connected to the support in the holding element connecting step by an adhesion process, the sensor seating surface reworked in the reworking step during hardening of the adhesive.

7. The method according to claim 1, wherein the reworking includes a material-removing process.

8. The method according to claim 7, wherein the material-removing process includes at least one of milling, drilling and laser processing.

9. The method according to claim 1, further comprising:
applying at least one centering pin receptacle in a correct position at the sensor seating surface; and
aligning the sensor with respect to rotation of the sensor about the sensor element by at least one centering pin arranged on the sensor.

10. The method according to claim 9, wherein the at least one centering pin receptacle is applied in the applying step during the reworking step.

11. The method according to claim 1, wherein at least one of (a) the holding element includes an accommodation for at least a part of the sensor and (b) the holding element includes a sensor antechamber protected from intrusion of at least one of (a) chips and (b) dirt.

12. The method according to claim 1, wherein at least one of (a) the holding element includes an accommodation for at least a part of the sensor and (b) the holding element includes a sensor antechamber protected from intrusion of at least one of (a) chips and (b) dirt by a cover element.

* * * * *